United States Patent
Huang et al.

(10) Patent No.: US 7,903,435 B2
(45) Date of Patent: Mar. 8, 2011

(54) SWITCHING CONTROLLER HAVING SWITCHING FREQUENCY HOPPING FOR POWER CONVERTER

(75) Inventors: Wei-Hsuan Huang, Taoyuan County (TW); Jenn-Yu G. Lin, Taipei Hsien (TW); Ta-Yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 278 days.

(21) Appl. No.: 12/276,415

(22) Filed: Nov. 24, 2008

(65) Prior Publication Data

US 2010/0033991 A1 Feb. 11, 2010

Related U.S. Application Data

(60) Provisional application No. 61/188,060, filed on Aug. 5, 2008.

(51) Int. Cl.
*H02M 3/335* (2006.01)
*G05F 1/40* (2006.01)
(52) U.S. Cl. .................. 363/21.13; 363/21.18
(58) Field of Classification Search .............. 363/16, 363/20, 21.01, 21.12, 21.13, 21.18; 323/282, 323/283, 285, 288
See application file for complete search history.

(56) References Cited

U.S. PATENT DOCUMENTS

| 7,239,119 B2 * | 7/2007 | Baurle et al. | 323/284 |
| 7,446,517 B2 * | 11/2008 | Chen et al. | 323/284 |
| 2010/0007394 A1 * | 1/2010 | Hsueh et al. | 327/176 |

OTHER PUBLICATIONS

Authored by Rahkala et al., article titled "Effects of Switching Frequency Modulation on EMI Performance of a Converter Using Spread Spectrum Approach", APEC 2002 (Applied Power Electronics Conference and Exposition, 2002), 2002 IEEE, pp. 93-99.

* cited by examiner

*Primary Examiner* — Matthew V Nguyen
(74) *Attorney, Agent, or Firm* — Jianq Chyun IP Office

(57) ABSTRACT

A switching controller having switching frequency hopping for a power converter includes a first oscillator generating a pulse signal and a maximum duty-cycle signal for determining a switching frequency of a switching signal, a pattern generator having a second oscillator and generating a digital pattern code in response to a clock signal, a programmable capacitor coupled to the pattern generator and the first oscillator for modulating the switching frequency of the switching signal in response to the digital pattern code, and a PWM circuit coupled to the first oscillator for generating the switching signal in accordance with the maximum duty-cycle signal. A maximum on-time of the switching signal is limited by the maximum duty-cycle signal. The switching signal is utilized to switch a transformer of the power converter.

7 Claims, 4 Drawing Sheets

US 7,903,435 B2

SWITCHING CONTROLLER HAVING SWITCHING FREQUENCY HOPPING FOR POWER CONVERTER

CROSS-REFERENCE TO RELATED APPLICATION

This application claims the priority benefit of U.S. provisional application Ser. No. 61/188,060, filed on Aug. 5, 2008. The entirety of the above-mentioned patent application is hereby incorporated by reference herein and made a part of specification.

BACKGROUND OF THE INVENTION

1. Field of the Invention

The present invention relates to a power converter in a switching mode, and more specifically relates to a switching controller with switching frequency hopping.

2. Description of Related Art

Power converters have been used to convert an AC power source to a regulated voltage or current. The power converters need to maintain an output voltage, output a current, or output power within a regulated range for efficient and safe operation of an electronic device. A problem of utilizing pulse width modulation is that the power converters operate at a relatively high frequency compared to the frequency of the AC power source, which results in a high frequency signal generated by the power converters. Although the switching technique reduces the size of the power supply, switching devices generate electric and magnetic interference (EMI) which interferes with the power source. Generally, an EMI filter disposed at an input of the power supply is utilized to reduce the EMI. However, the EMI filter causes power consumption and increases the cost and the size of the power supply. In recent development, it has been proposed in related art to reduce the EMI by using frequency modulation or frequency hopping, e.g., in "Effects of Switching Frequency Modulation on EMI Performance of a Converter Using Spread Spectrum Approach" by M. Rahkala, T. Suntio, K. Kalliomaki, APEC 2002 (Applied Power Electronics Conference and Exposition, 2002), 17-Annual, IEEE, Volume 1, 10-14 Mar. 2002.

SUMMARY OF THE INVENTION

The present invention provides a switching controller having switching frequency hopping to reduce the EMI for a power converter. The switching controller includes a first oscillator to generate a pulse signal and a maximum duty-cycle signal for determining a switching frequency of a switching signal. A pattern generator with a second oscillator generates a digital pattern code in response to a block signal, wherein the clock signal is generated by the second oscillator. A programmable capacitor is coupled to the pattern generator and the first oscillator for modulating the switching frequency of the switching signal in response to the digital pattern code. A pulse width modulation (PWM) circuit is coupled to the first oscillator for generating the switching signal in accordance with the maximum duty-cycle signal. A maximum on-time of the switching signal is limited by the maximum duty-cycle signal. Thus, the EMI can be improved and the EMI filter is not required.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
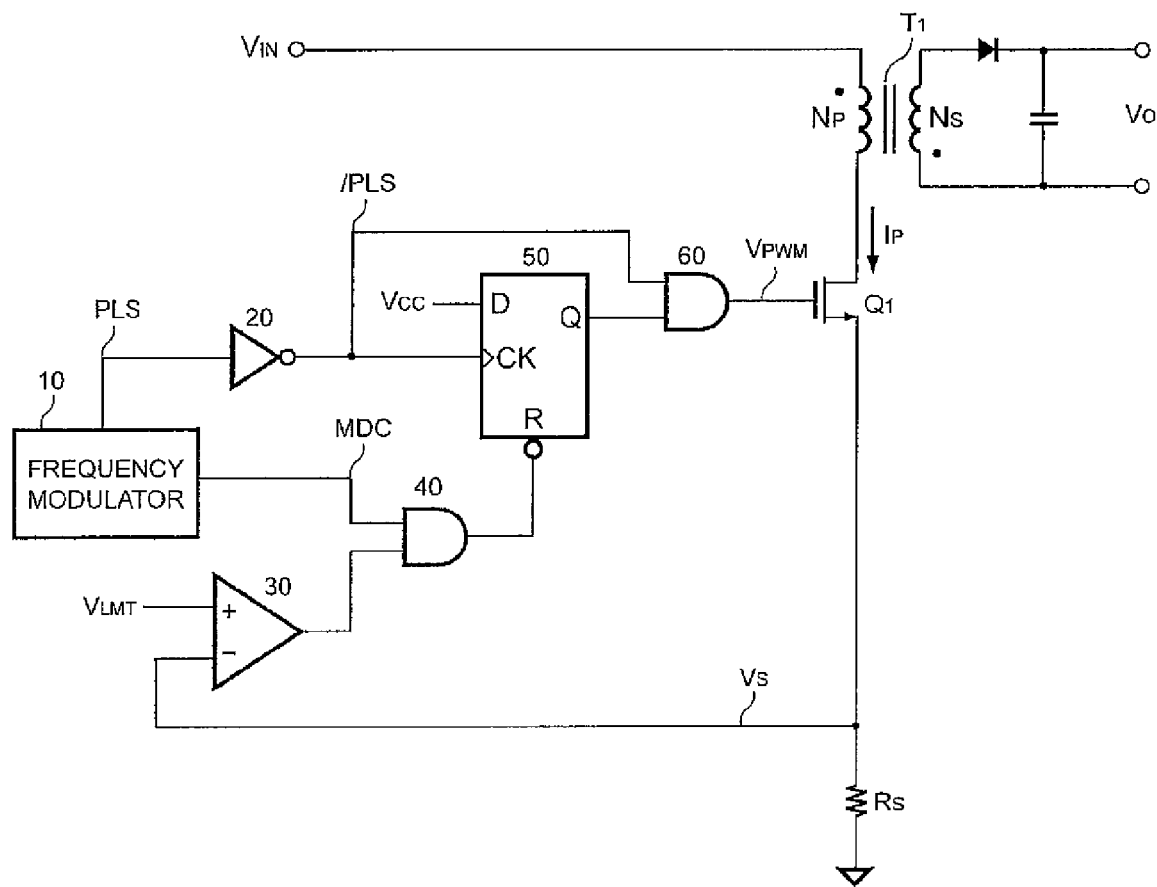
FIG. 1 shows a power supply having a switching controller according to the present invention.

FIG. 1 shows a power supply having a switching controller according to the present invention. The switching controller includes a PWM circuit and a frequency modulator 10. The switching controller generates a switching signal $V_{PWM}$ for switching a transformer $T_1$ via a power transistor $Q_1$. The transformer $T_1$ receives input voltage Vin and generates an output voltage Vo having a primary side Np and a secondary side Ns. The duty cycle of the switching signal $V_{PWM}$ determines the power supplied by an AC power source to an output of the power supply. The PWM circuit comprises an inverter 20, a comparator 30, a first AND gate 40, a D flip-flop 50, and a second AND gate 60. A switching current $I_P$ of the transformer $T_1$ is converted to a current signal $V_S$ (in voltage form) through a sense resistor $R_S$. The current signal $V_S$ is provided to the PWM circuit for pulse width modulation of the switching signal $V_{PWM}$. A negative input of the comparator 30 is supplied with the current signal $V_S$. A positive input of the comparator 30 receives a current-limit signal $V_{LMT}$ to limit the maximum output power.

An input D of the D flip-flop 50 is pulled high by a supply voltage $V_{CC}$. A clock input CK of the D flip-flop 50 is supplied with a pulse signal PLS through the inverter 20. A first input of the first AND gate 40 is coupled to the frequency modulator 10 to receive a maximum duty-cycle signal MDC. A second input of the first AND gate 40 is connected to an output of the comparator 30. An output of the first AND gate 40 is used to reset the D flip-flop 50 once the current signal $V_S$ is higher than the current-limit signal $V_{LMT}$ and a maximum duty-cycle signal MDC is at a low level. A first input of the second AND gate 60 is connected to an output of the inverter 20 to receive an inverse pulse signal /PLS. An input of the inverter 20 is connected to the frequency modulator 10 to receive a pulse signal PLS. A second input of the second AND gate 60 is connected to an output Q of the D flip-flop 50. An output of the second AND gate 60 is connected to the power transistor $Q_1$ to generate the switching signal $V_{PWM}$.

Figure 2:
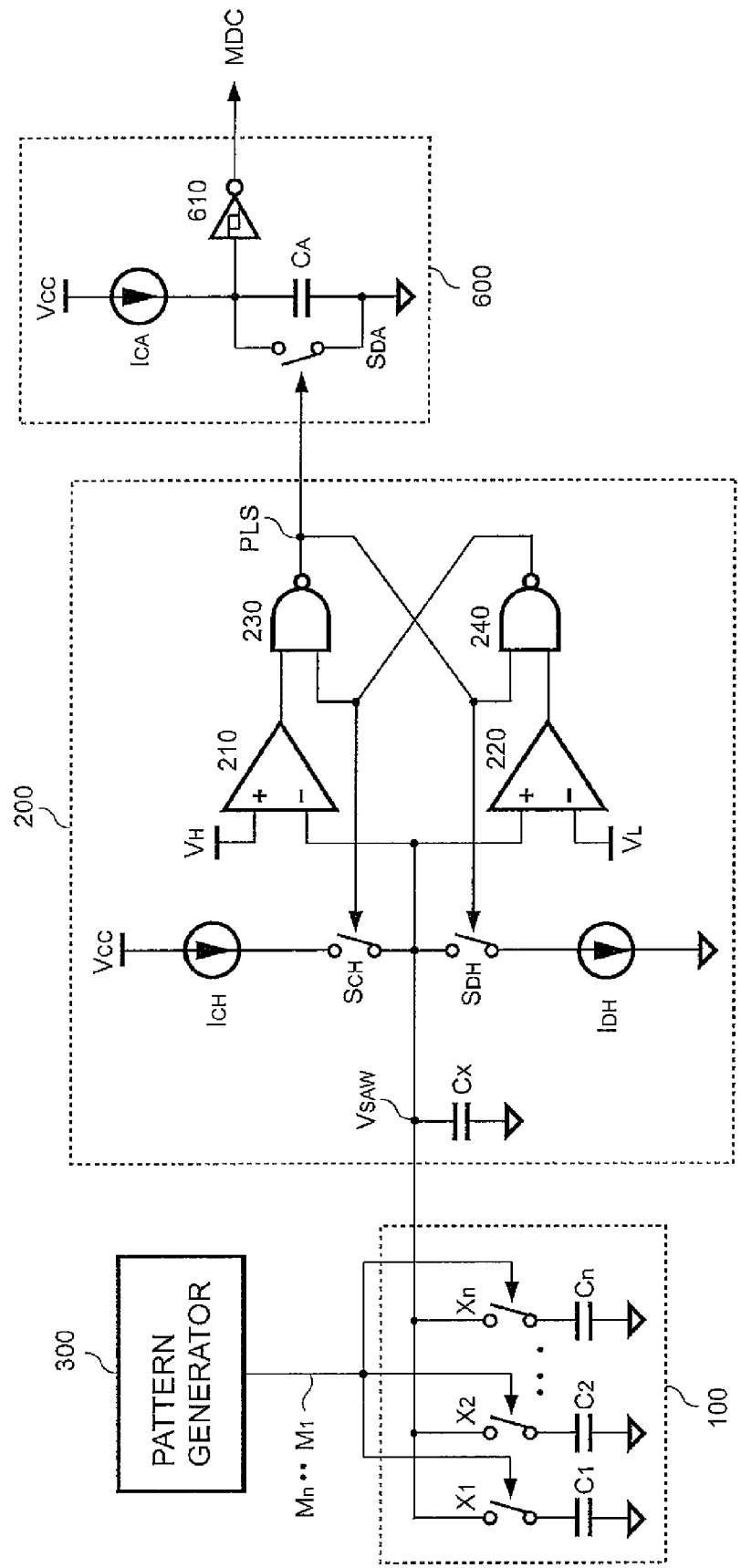
FIG. 2 shows an embodiment of a frequency modulator having frequency hopping according to the present invention.

FIG. 2 shows an embodiment of a frequency modulator according to the present invention. In FIG. 2, the frequency modulator 10 includes a pattern generator 300, a programmable capacitor 100, and a first oscillator 200 with a maximum duty-cycle circuit 600. The pattern generator 300 is utilized to generate digital pattern codes Mn ... $M_1$. The programmable capacitor 100 receives the digital pattern codes Mn ... $M_1$ of the pattern generator 300 for generating an oscillation signal $V_{SAW}$. The first oscillator 200 is coupled to the programmable capacitor 100 for generating the pulse signal PLS in response to the oscillation signal $V_{SAW}$. The maximum duty-cycle circuit 600 generates the maximum duty-cycle signal MDC in response to the pulse signal PLS.

The programmable capacitor 100 is coupled to the pattern generator 300 to receive the digital pattern codes Mn ... $M_1$.

The programmable capacitor 100 comprises a plurality of switching-capacitor sets connected to one another in parallel. The switching-capacitor sets are formed by capacitors $C_1$, $C_2$, ..., $Cn$ and switches $X_1$, $X_2$, ..., $Xn$. The switch $X_1$ and the capacitor $C_1$ are connected in series. The switch $X_2$ and the capacitor $C_2$ are connected in series. The switch $Xn$ and the capacitor $Cn$ are connected in series. The digital pattern codes $Mn$ ... $M_1$ control switches $X_1$, $X_2$, ..., $Xn$. An output of the programmable capacitor 100 is coupled to the first oscillator 200 for modulating the oscillation signal $V_{SAW}$ in accordance with the digital pattern codes $Mn$ ... $M_1$.

The first oscillator 200 includes a charging switch $S_{CH}$, a discharging switch $S_{DH}$, a saw-tooth capacitor $C_X$, a charging current $I_{CH}$, a discharging current $I_{DH}$, a first comparator 210, a second comparator 220, and two NAND gates 230 and 240. The charging switch $S_{CH}$ is connected between the charging current $I_{CH}$ and the saw-tooth capacitor $C_X$. The discharging switch $S_{DH}$ is connected between the saw-tooth capacitor $C_X$ and the discharging current $I_{DH}$. The oscillation signal $V_{SAW}$ at the saw-tooth capacitor $C_X$ is coupled to the output of the programmable capacitor 100. The first comparator 210 has a positive input supplied with a threshold voltage $V_H$. A negative input of the first comparator 210 is connected to the saw-tooth capacitor $C_X$. The second comparator 220 has a negative input supplied with a threshold voltage $V_L$. The threshold voltage $V_H$ is higher than the threshold voltage $V_L$. A positive input of the second comparator 220 is connected to the saw-tooth capacitor $C_X$. An output of the NAND gate 230 generates the pulse signal PLS to turn on/off the discharging switch $S_{DH}$. A first input of the NAND gate 230 is driven by an output of the first comparator 210. Two inputs of the NAND gate 240 are respectively connected to the output of the NAND gate 230 and an output of the second comparator 220. The output of the NAND gate 240 is connected to a second input of the NAND gate 230 and turns on/off the charging switch $S_{CH}$. The first oscillator 200 is coupled to the programmable capacitor 100 for generating the pulse signal PLS in response to the oscillation signal $V_{SAW}$ at the saw-tooth capacitor $C_X$.

When the charging switch $S_{CH}$ is turned on, the charging current $I_{CH}$ charges the saw-tooth capacitor $C_X$, and the oscillation signal $V_{SAW}$ increases. During this period, the oscillation signal $V_{SAW}$ is lower than the threshold voltage $V_H$, and the discharging switch $S_{DH}$ is turned off. The discharging current $I_{DH}$ discharges the saw-tooth capacitor $C_X$, and the oscillation signal $V_{SAW}$ decreases when the oscillation signal $V_{SAW}$ is over than the threshold voltage $V_H$. At this time, the charging switch $S_{CH}$ is turned off and the discharging switch $S_{DH}$ is turned on. The charging switch turns on again when the oscillation signal $V_{SAW}$ is lower than the threshold voltage $V_L$. The switching period of the oscillation signal $V_{SAW}$ is controlled by the capacitance of the saw-tooth capacitor $C_X$ connected to the switching-capacitor sets in parallel. The switches $X_1$, $X_2$, ..., $Xn$ are controlled by the digital pattern codes $Mn$ ... $M_1$ to determine the quantity of the switching-capacitor sets.

The maximum duty-cycle circuit 600 includes a first switch $S_{DA}$, a first charging current $I_{CA}$, a first capacitor $C_A$, and a first trigger 610. The first switch $S_{DA}$ is connected to the first charging current $I_{CA}$ and connected to the first capacitor $C_A$ in parallel. The first switch $S_{DA}$ is controlled by the pulse signal PLS. The first capacitor $C_A$ is charged by the first charging current $I_{CA}$ once the first switch $S_{DA}$ is turned off. In other words, the first capacitor $C_A$ is discharged when the first switch $S_{DA}$ is turned on. An input of the first trigger 610 is coupled to the first switch $S_{DA}$, the first charging current $I_{CA}$, and the first capacitor $C_A$. The first trigger 610 can serve as a Schmitt trigger circuit. An output of the first trigger 610 generates the maximum-duty-cycle signal MDC in response to the pulse signal PLS of the first oscillator 200. The pulse width of the maximum duty-cycle signal MDC is determined by the first charging current $I_{CA}$ and the first capacitor $C_A$. Furthermore, the maximum on-time of the switching signal $V_{PWM}$ is determined by the maximum duty-cycle signal MDC.

Figure 3:
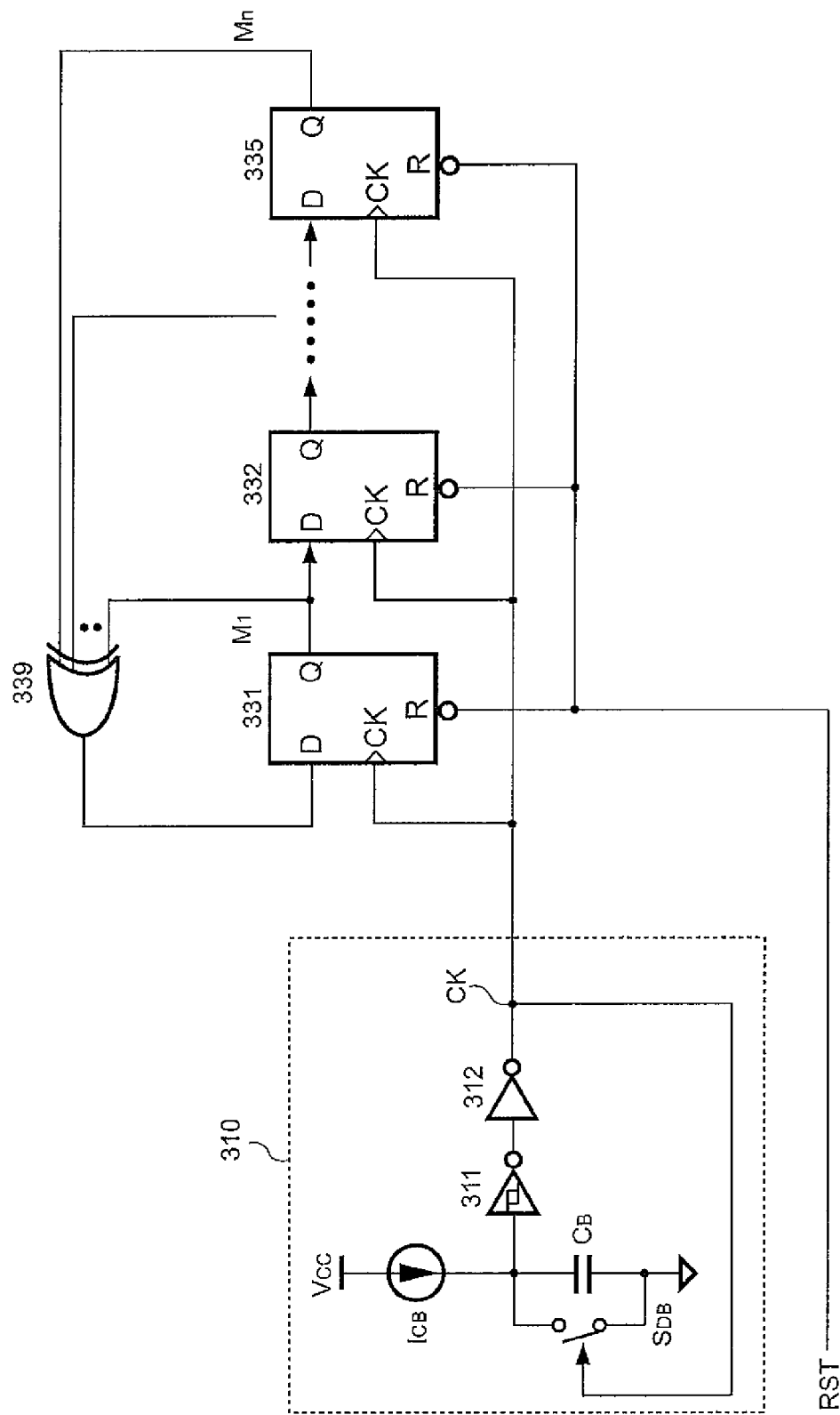
FIG. 3 shows an embodiment of a pattern generator according to the present invention.

FIG. 3 shows an embodiment of the pattern generator 300 according to the present invention. The pattern generator 300 includes a second oscillator 310, a plurality of registers 331, 332, ..., 335, and a XOR gate 339. The registers 331, 332, ..., 335 and the XOR gate 339 develop a linear feedback shift register (LFSR) for generating a linear code in response to a clock signal CK of the second oscillator 310. The inputs of the XOR gate 339 determine the polynomials of the linear feedback shift register and decide the output of the linear feedback shift register. Furthermore, the digital pattern codes $Mn$ ... $M_1$ can be adopted from the part of the linear code to optimize the application.

The second oscillator 310 includes a second switch $S_{DB}$, a second charging current $I_{CB}$, a second capacitor $C_B$, a second trigger 311, and an inverter 312. The second switch $S_{DB}$ is coupled to the second charging current $I_{CB}$ and connected to the second capacitor $C_B$ in parallel. The second switch $S_{DB}$ is controlled by the clock signal CK. The second capacitor $C_B$ is charged by the second charging current $I_{CB}$ once the second switch $S_{DB}$ is turned off. In other words, the second capacitor $C_B$ is discharged when the second switch $S_{DB}$ is turned on. An input of the second trigger 311 is coupled to the second switch $S_{DB}$, the second charging current $I_{CB}$, and the second capacitor $C_B$. The second trigger 311 can also serve as the Schmitt trigger circuit. An output of the second trigger 311 is coupled to an input of the inverter 312. An output of the inverter 312 generates the clock signal CK.

The second oscillator 310 generates the clock signal CK. The pattern generator 300 is utilized to generate the digital pattern codes $Mn$ ... $M_1$ in response to the clock signal CK of the second oscillator 310. The first oscillator 200 is used for determining a pulse width of the pulse signal PLS and a switching frequency of the switching signal $V_{PWM}$. As mentioned above, the pulse signal PLS and the clock signal CK are asynchronous because both of them are generated by two different oscillators. Therefore, the switching signal $V_{PWM}$ is independent of the clock signal CK. The programmable capacitor 100 is coupled to the pattern generator 300 and the first oscillator 200 for modulating the switching frequency of the switching signal $V_{PWM}$ in response to the digital pattern codes $Mn$ ... $M_1$.

Figure 4:
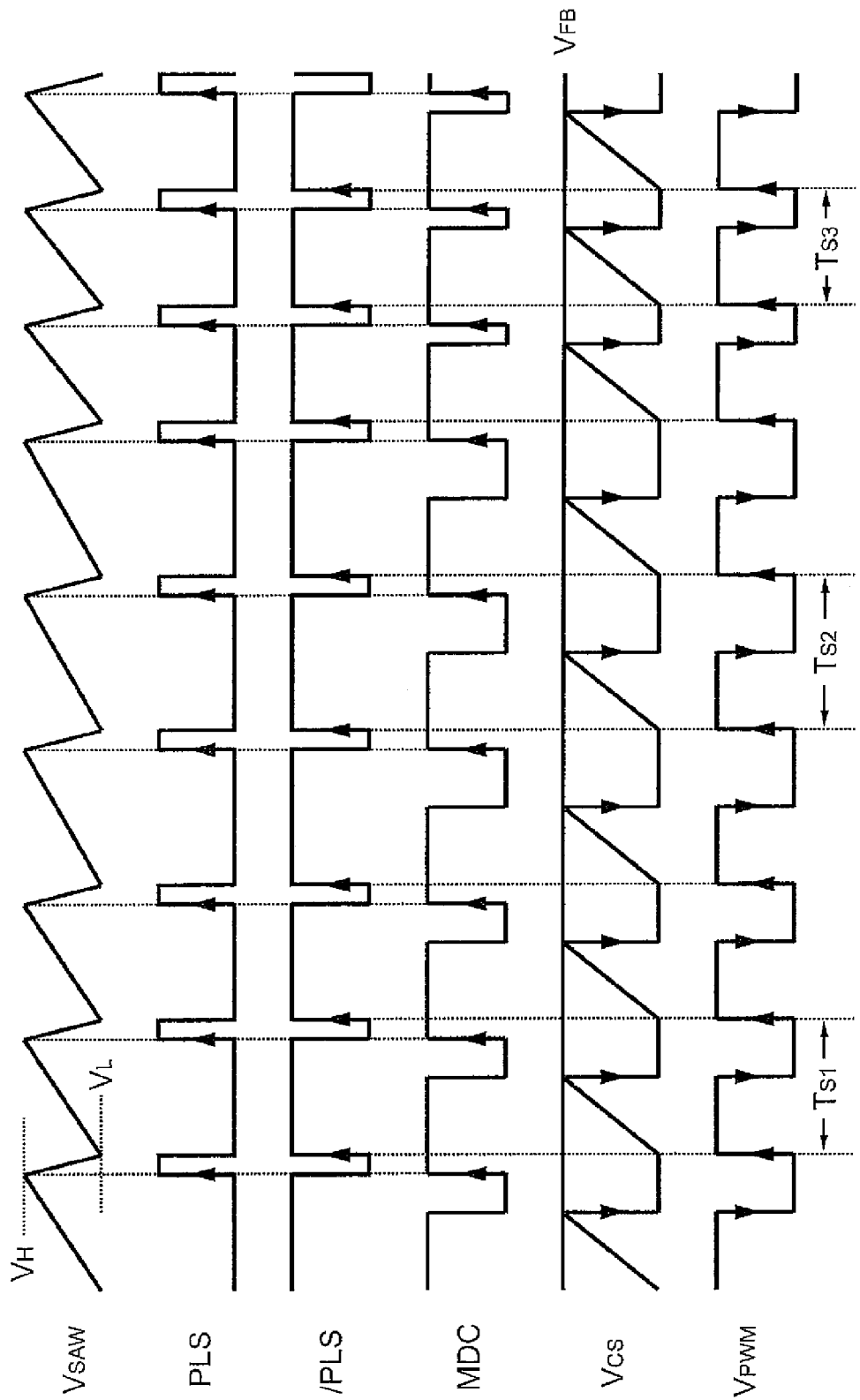
FIG. 4 shows waveforms of an oscillation signal, a pulse signal, an inverse pulse signal, a maximum duty-cycle signal, a current signal and a switching signal according to the present invention.

FIG. 4 shows waveforms of the oscillation signal $V_{SAW}$, the pulse signal PLS, the inverse pulse signal /PLS, the maximum-duty-cycle signal MDC, the current signal $V_S$, and the switching signal $V_{PWM}$ according to the present invention. The digital pattern codes $Mn$ ... $M_1$ control the switching-capacitor sets to connect the saw-tooth capacitor $C_X$ in parallel for modulating the oscillation signal $V_{SAW}$. The different capacitances of the saw-tooth capacitor $C_X$ cycle-by-cycle generate the frequency variation of the switching signal $V_{PWM}$. The switching periods $T_{S1}$, $T_{S2}$, and $T_{S3}$ represent the switching frequency hopping for the switching signal $V_{PWM}$, respectively. The maximum duty-cycle signal MDC is utilized to limit the maximum on-time of the switching signal $V_{PWM}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching controller having switching frequency hopping for a power converter, comprising:
   a first oscillator, generating a pulse signal and a maximum duty-cycle signal for determining a switching frequency of a switching signal;
   a pattern generator with a second oscillator, generating a digital pattern code in response to a clock signal, wherein the clock signal is generated by the second oscillator;
   a programmable capacitor, coupled to the pattern generator and the first oscillator for modulating the switching frequency of the switching signal in response to the digital pattern code; and
   a PWM circuit, coupled to the first oscillator for generating the switching signal in accordance with the maximum duty-cycle signal, a maximum on-time of the switching signal being limited by the maximum duty-cycle signal, wherein the switching signal is utilized to switch a transformer of the power converter.

2. The switching controller as claimed in claim 1, wherein a switching period of the pulse signal is correlated to a switching period of the switching signal.

3. The switching controller as claimed in claim 1, wherein a switching period generated by the first oscillator is independent of a switching period generated by the second oscillator.

4. The switching controller as claimed in claim 1, wherein a switching period of the pulse signal is independent of a switching period of the clock signal.

5. The switching controller as claimed in claim 1, wherein the digital pattern code controls switching-capacitor sets to connect a saw-tooth capacitor in parallel for modulating an oscillation signal, and different capacitances of the saw-tooth capacitor cycle-by-cycle generates frequency variation of the switching signal.

6. The switching controller as claimed in claim 1, wherein the programmable capacitor comprises a plurality of switching-capacitor sets connected to one another in parallel, the switching-capacitor sets are formed by several switches and capacitors connected in series respectively, and the switches are controlled by the digital pattern code.

7. The switching controller as claimed in claim 1, wherein the second oscillator comprises:
   a second switch, coupled to a second charging current, the second switch being controlled by the clock signal;
   a second capacitor, coupled to the second charging current and connected to the second switch in parallel, wherein the second capacitor is charged by the second charging current once the second switch is turned off, and the second capacitor is discharged when the second switch is turned on; and
   a second trigger and an inverter, coupled to the second switch, the second charging current, and the second capacitor for generating the clock signal.

* * * * *